Figure 1:
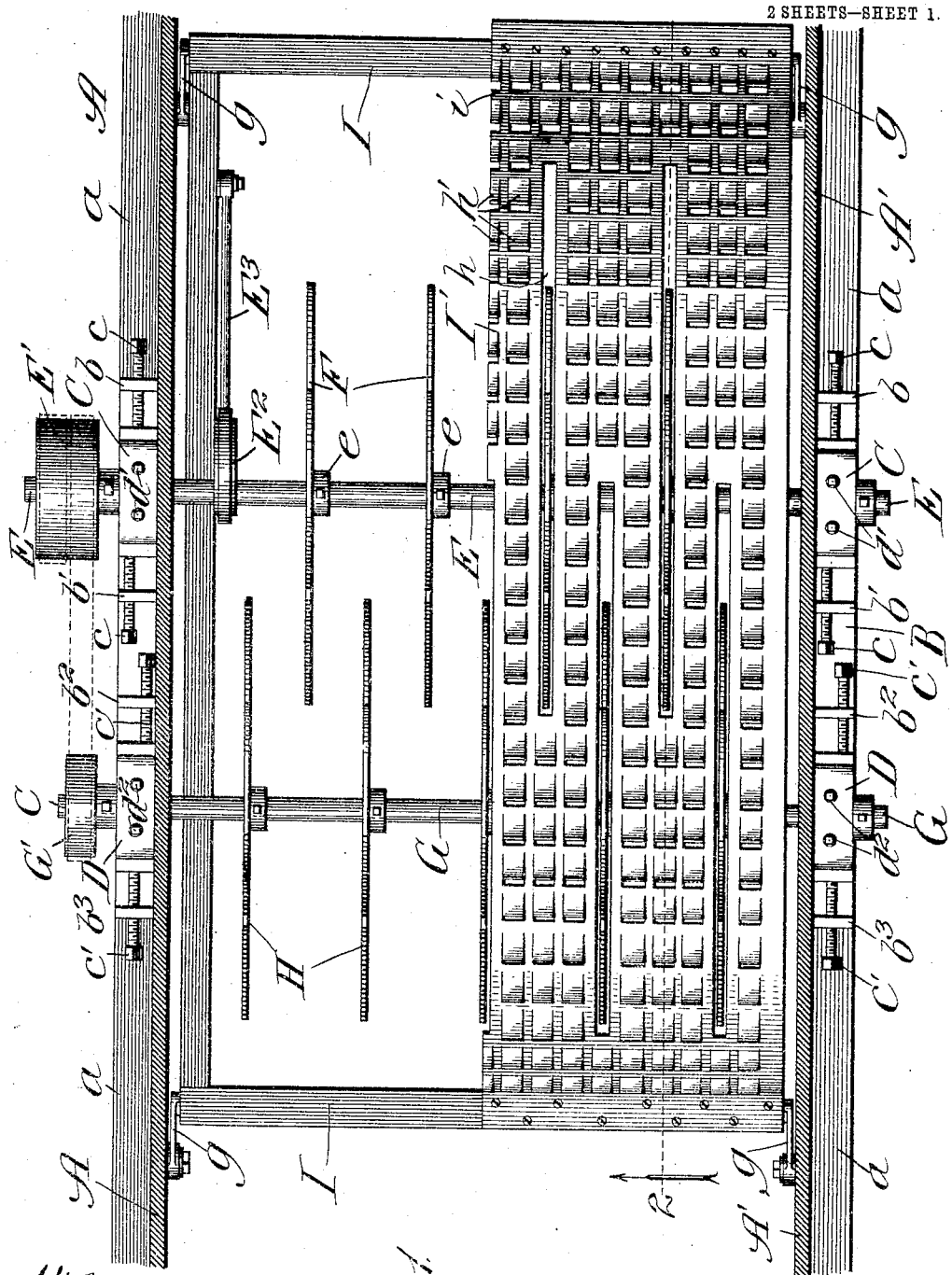

No. 779,808. PATENTED JAN. 10, 1905.
J. SCHULTZ.
SEPARATOR ATTACHMENT FOR THRESHING MACHINES.
APPLICATION FILED SEPT. 12, 1904.

2 SHEETS—SHEET 1.

Witnesses:
Chas. S. Taylor.
John Enders.

Inventor:
John Schultz,
By Dyrenforth, Dyrenforth & Lee,
Attys.

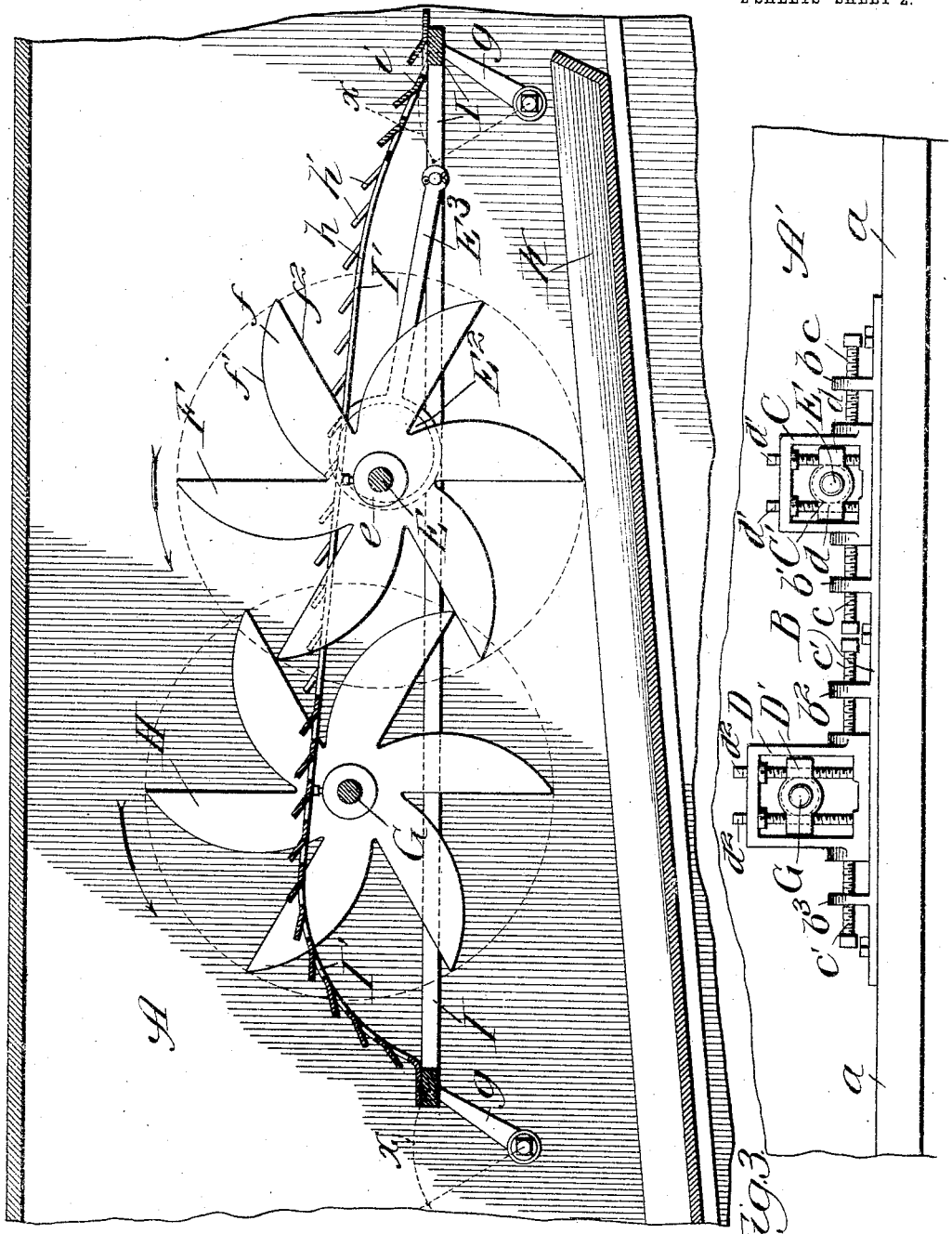

No. 779,808.

Patented January 10, 1905.

UNITED STATES PATENT OFFICE.

JOHN SCHULTZ, OF SENECA, ILLINOIS.

SEPARATOR ATTACHMENT FOR THRESHING-MACHINES.

SPECIFICATION forming part of Letters Patent No. 779,808, dated January 10, 1905.

Application filed September 12, 1904. Serial No. 224,074.

*To all whom it may concern:*

Be it known that I, JOHN SCHULTZ, a citizen of the United States, residing at Seneca, in the county of Lasalle and State of Illinois, have invented a new and useful Improvement in Separator Attachments for Threshing-Machines, of which the following is a specification.

My object is to provide as a part of or attachment for a threshing-machine a separator of simple and improved construction which will operate quickly and effectively to remove any grain that may remain in the straw after the threshing operation, and thus cause the straw to be discharged from the machine free from the presence of grain.

Referring to the accompanying drawings, Figure 1 is a broken plan sectional view of the device with one-half the straw-carrier feature removed to disclose parts which would otherwise be hidden; Fig. 2, a broken longitudinal section taken on line 2 in Fig. 1 and viewed in the direction of the arrow; and Fig. 3, a broken view taken at one side of the device, showing adjustable journal-bearings for the shafts of the straw-lifters which I employ.

A A' are the sides of the machine provided with longitudinally-extending bars $a\,a$. Fastened upon the bars $a$ are coincident journal-box-holding frames B, each formed with four upright lugs $b$, $b'$, $b^2$, and $b^3$, located as shown in Fig. 3. Between the lugs $b\,b'$ of each frame B is a sliding journal-box frame C, adjustable longitudinally of the machine by means of set-screws $c$, which work through threaded openings in the lugs $b\,b'$ and bear against opposite ends of the frame C. In each frame C is a journal-box C', provided with ears $d$, through which pass vertical screws $d'$, mounted in the frame C. The screws $d'$ support the box C' and may be turned to adjust the same vertically. Between the lugs $b^2\,b^3$ of each frame B is a sliding journal-box frame D, also adjustable longitudinally of the machine by means of set-screws $c'$, working through the said lugs. The frame D extends somewhat higher than the frame C and contains a journal-box D', which may be raised and lowered by means of screws $d^2$ in the same way as the box C'.

Journaled in the boxes C' is a transverse shaft E, carrying beyond the side A a wide-faced pulley E'. Fastened to the shaft E is a series of straw-lifters or beater-disks F, placed equidistant along the shaft between the sides, as shown. Each disk or lifter has a central hub portion $e$ and a plurality of radially-extending arms $f$, presenting convex forward edges $f'$ and straight rear edges $f^2$.

Journaled in the boxes D' is a cross-extending shaft G; provided beyond the side A with a pulley G', belted to the pulley E' to be driven thereby.

H is a series of straw-lifters or beater-disks equidistant apart on the shaft G and formed in every way like the disks F. The disks F H intermesh, as shown, and rotate in the direction of the arrows in Fig. 2.

I is a rectangular reciprocating frame pivotally mounted at its four corners upon swinging links $g$, which at their lower ends are pivotally secured to the sides of the machine. On the shaft E is an eccentric $E^2$, from which extends a pitman $E^3$, pivotally connected with the frame I. Fastened upon the frame I is a straw-carrier I', comprising a sheet of metal the width of the frame I, fastened at opposite ends to the front and rear bars of the said frame. In the straw-carrier are elongated openings $h$, through which the disks F H project, the openings being sufficiently long to permit the straw-carrier to reciprocate, as hereinafter described, without touching the disks in any position of their adjustment. The sheet I' is provided throughout with lips or teeth $h'$, cut from the metal at three sides and raised to present shoulders, and openings beneath the shoulders large enough for the passage of grain.

Power is applied to the pulley E' to rotate the shafts E and G. The straw, with grain mixed therewith, may in operation be discharged by a grain-dropper or otherwise from the threshing mechanism onto the part $i$ of the straw-carrier. The latter is moved back and forth by the pitman, as indicated by the dotted arcs $x$ in Fig. 2, to advance the straw to the first series of disks or lifters F. These disks toss the straw and by loosening it tend to shake out any grain that may be mixed therewith. The grain falls upon the carrier I' and passes through the openings therein, falling into a pan or chute K beneath the carrier. The straw carried over the disks F is then engaged by the disks H and is tossed and shaken up in the same manner as before to insure the freeing of any further grain not separated by the action of the first set of disks. The pulley G' is of smaller diameter than the pulley E', whereby the shaft G and disks H rotate much faster than the disks F.

The shafts E and G may be readily adjusted at their journal-boxes, as described, to raise or lower them with relation to the straw-carrier I' and each other or to place them nearer together or farther apart, as may be required to produce the best results. In the rotation of the disks F they have a tendency to throw off the straw; but any portion thereof carried downward by the said disks will be engaged by the more rapidly rotating disks H and thrown off to prevent its being caught against the carrier and clogging the machine.

The construction of the straw-carrier described renders it positive in action, light, and comparatively inexpensive. The openings beneath the teeth will permit the ready passage of grain through them, but will tend to cause broken bits of straw or other material larger than grain to be moved along with the straw.

While I prefer to construct my improvements throughout as shown and described, they may be variously modified in the matter of details without departing from the spirit of my invention as defined by the claims.

What I claim as new, and desire to secure by Letters Patent, is—

1. In a separator attachment for threshing-machines, a pair of transverse parallel rotating shafts, means for adjusting the shafts with relation to each other, a series of straw-lifters on the shafts comprising disks formed with radially-extending arms having convex straw-engaging edges, the lifters on one said shaft intermeshing with those on the other shaft, and a reciprocating straw-carrier through which the lifters project, substantially as described.

2. In a separator attachment for threshing-machines, a pair of transverse parallel shafts, means for adjusting the shafts with relation to each other, means for driving the shafts and rotating the shaft nearest the discharge end of the machine at higher speed than the other shaft, a series of straw-lifters on each of the shafts comprising disks formed with radially-extending arms having convex straw-engaging edges, the lifters on one said shaft intermeshing with those on the other shaft, and a reciprocating straw-carrier through which the lifters project, substantially as described.

3. In a separator attachment for threshing-machines, the combination of a pair of parallel rotary transverse shafts, series of straw-lifting disks on the shafts having radially-extending arms provided with convex straw-engaging edges, and a straw-carrier comprising a reciprocating frame having a covering of sheet metal provided with narrow elongated openings, through which the straw-lifters project, and with straw-engaging teeth cut and raised from the sheet to form openings beneath the teeth for the passage of grain, substantially as and for the purpose set forth.

4. In a separator attachment for threshing-machines, the combination of the shafts E G, intermeshing straw-lifters F H on the shafts formed with radial arms having convex forward edges $f'$, driving means for the shafts operating to turn the shaft G at greater speed than the shaft E, a straw-carrier frame I pivotally mounted in a plane below the said shafts, means for reciprocating said frame, and a metal sheet on said frame provided with elongated openings through which the said lifters project and a plurality of straw-engaging teeth cut from the metal and raised to form shoulders and openings beneath the shoulders for the passage of grain, all constructed and arranged to operate substantially as and for the purpose set forth.

JOHN SCHULTZ.

In presence of—
WALTER N. WINBERG,
ALMA U. THORIEN.